United States Patent
Wang et al.

(10) Patent No.: US 10,554,862 B2
(45) Date of Patent: Feb. 4, 2020

(54) SYSTEM AND METHOD FOR RETAINING COLOR GAMUT

(71) Applicant: SHENZHEN TCL DIGITAL TECHNOLOGY LTD., Shenzhen, Guangdong (CN)

(72) Inventors: Tiantian Wang, Guangdong (CN); Xiaodong Zhang, Guangdong (CN); Renli Xie, Guangdong (CN); Zeyin Wei, Guangdong (CN)

(73) Assignee: SHENZHEN TCL DIGITAL TECHNOLOGY LTD., Shenzhen, Guangdong (CN)

( * ) Notice: Subject to any disclaimer, the term of this patent is extended or adjusted under 35 U.S.C. 154(b) by 0 days.

(21) Appl. No.: 16/461,973

(22) PCT Filed: Dec. 28, 2016

(86) PCT No.: PCT/CN2016/112575
§ 371 (c)(1),
(2) Date: May 17, 2019

(87) PCT Pub. No.: WO2018/049754
PCT Pub. Date: Mar. 22, 2018

(65) Prior Publication Data
US 2019/0306378 A1 Oct. 3, 2019

(30) Foreign Application Priority Data

Sep. 19, 2016 (CN) .......................... 2016 1 0831790

(51) Int. Cl.
*H04N 1/60* (2006.01)
(52) U.S. Cl.
CPC ......... *H04N 1/6058* (2013.01); *H04N 1/6016* (2013.01)

(58) Field of Classification Search
CPC ........................... H04N 1/6058; H04N 1/6016
See application file for complete search history.

(56) References Cited

U.S. PATENT DOCUMENTS

| | | |
|---|---|---|
| 6,873,439 B2 | 3/2005 | Levy et al. |
| 8,537,177 B2 | 9/2013 | Bhaskaran et al. |
| | (Continued) | |

FOREIGN PATENT DOCUMENTS

| | | |
|---|---|---|
| AU | 2003218104 A1 | 3/2003 |
| CN | 1972368 A | 5/2007 |
| | (Continued) | |

OTHER PUBLICATIONS

International Search Report and Written Opinion dated May 4, 2017; PCT/CN2016/112575.

(Continued)

*Primary Examiner* — King Y Poon
*Assistant Examiner* — Michael Burleson

(57) ABSTRACT

The present disclosure provides a system and a method for retaining color gamut. The system includes: a first converting module, configured to convert a color system of the first color gamut into a first converted color gamut; a second converting module, configured to convert a color system of the second color gamut into a second converted color gamut; a coordinate point mapping module, configured to calculate a coordinate point in the second converted color gamut corresponding to each coordinate point in the first converted color gamut according to a corresponding algorithm; a correspondence table generating module, configured to generate a correspondence table of the first converted color gamut and the second converted color gamut; a standard color comparison table generating module, configured to generate the standard color comparison table according to the correspondence table.

16 Claims, 6 Drawing Sheets

(56) References Cited

U.S. PATENT DOCUMENTS

| | | |
|---|---|---|
| 8,860,747 B2 | 10/2014 | Bhaskaran et al. |
| 2003/0174885 A1 | 9/2003 | Levy et al. |
| 2006/0119870 A1* | 6/2006 | Ho .................... H04N 1/6058 358/1.9 |
| 2008/0080767 A1 | 4/2008 | Cho et al. |
| 2011/0013208 A1 | 1/2011 | Bhaskaran et al. |
| 2014/0002480 A1 | 1/2014 | Bhaskaran et al. |

FOREIGN PATENT DOCUMENTS

| | | |
|---|---|---|
| CN | 101150654 A | 3/2008 |
| CN | 101198070 A | 6/2008 |
| CN | 101621700 A | 1/2010 |
| CN | 101794565 A | 8/2010 |
| CN | 102611897 A | 7/2012 |
| CN | 104601859 A | 5/2015 |
| CN | 104796679 A | 7/2015 |
| CN | 105100761 A | 11/2015 |
| WO | 03/079669 A1 | 9/2003 |

OTHER PUBLICATIONS

Chinese Office Action dated May 3, 2018; Appln. No. 201610831790.7.

\* cited by examiner

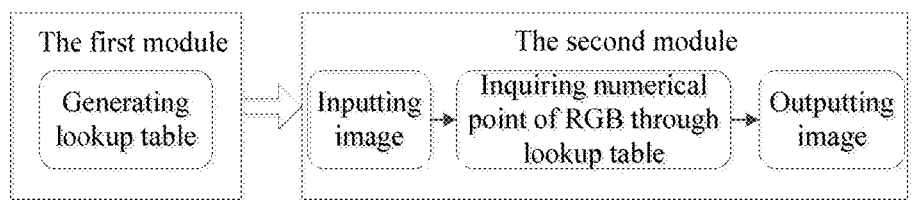
FIG. 5
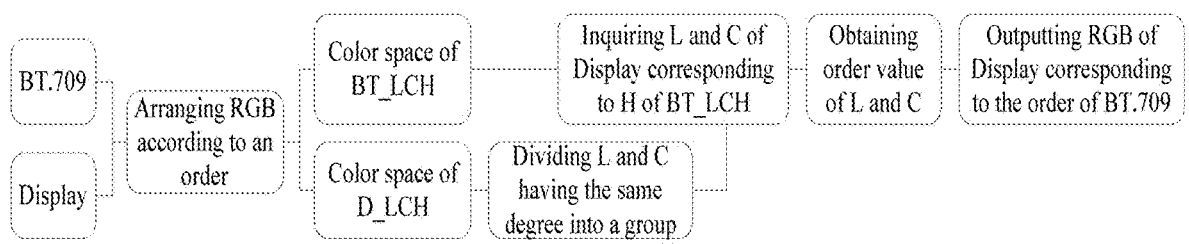
FIF. 6

SYSTEM AND METHOD FOR RETAINING COLOR GAMUT

TECHNICAL FIELD

The present disclosure relates to the field of image processing technology, and more particularly relates to a system and a method for retaining color gamut.

BACKGROUND

Image color Gamut is an area that is defined by a certain quantity of colors. Different displays have different color gamut ranges. The internationally accepted color measurement standard is the color gamut range specified by National Television Standards Committee (NTSC, US), namely, the color range that can be presented in display. The color range that each TV set can deal with is related to the technology used for producing the TV set. International Lighting Association (CIE) has developed a CIE-xy chromaticity diagram which is used to describe the color gamut. In the diagram, the range of the triangle formed by connecting the RGB three points represents the color gamut ranges of various display devices, and the larger the area of the triangle is, the larger the color gamut range of the display device is. As shown in FIG. 1, the black triangle represents the source end, and is generally recorded as BT.709 in displays. The white area represents the display end. For different displays have different display ranges, the areas of the triangle are also different. The larger the triangle is, the broader the display range is.

Color gamut retaining of images refers to that the color gamut of the source end is displayed within the color gamut of the display end, and the range of the color gamut finally displayed on the display is the range of the color gamut of the source end. As shown in FIG. 1, the coordinates of the RGB three points of the source end are retained and displayed within the range of the color gamut of the display end. At present, the method for retaining color gamut of image is, as shown in FIG. 2, the RGB color gamuts of the source end and the display end are converted to XYZ color gamut respectively; the XYZ color gamut of the display end corresponding to the XYZ color gamut of the source end is inquired; then the inquired XYZ color gamut of the source end is converted back to the RGB color gamut by an inverse matrix; finally, the result is outputted.

Currently, the RGB values of each pixel needs to be converted to XYZ at the time point the RGB values are imputed, then XYZ of the display end is inquired, and the inquired XYZ is finally converted back to RGB. When the image imputed is a large image, the RGB values corresponding to each pixel need to be calculated, thus it would take a lot of time to generate a new image, resulting in a waste of time and a consumption of CPU. Therefore, the computational efficiency is low.

SUMMARY

It is therefore one main objective of the disclosure to provide a system and a method for retaining color gamut, aiming to speed up an image processing, save time, and reduce the consumption of CPU.

According to an exemplary embodiment of the present disclosure, a system for retaining color gamut is provided, the color gamut of an image which is transmitted from a first color gamut to a second color gamut is retained by generating a standard color comparison table of image colors in the first color gamut and image colors in the second color gamut, the system includes:

a first converting module, configured to convert a color system of the first color gamut into a first converted color gamut, a coordinate of the first converted color gamut includes a first chroma, a first luminance, and a first hue;

a second converting module, configured to convert a color system of the second color gamut into a second converted color gamut, a coordinate of the second converted color gamut includes a second chroma, a second luminance, and a second hue;

a coordinate point mapping module, configured to calculate a coordinate point in the second converted color gamut corresponding to each coordinate point in the first converted color gamut according to a corresponding algorithm;

a correspondence table generating module, configured to generate a correspondence table of the first converted color gamut and the second converted color gamut according to a correspondence relationship between the coordinate point in the first converted color gamut and the coordinate point in the second converted color gamut; and a standard color comparison table generating module, configured to convert the first converted color gamut in the correspondence table into the color system of the first color gamut, and convert the second converted color gamut in the correspondence table into the color system of the second color gamut, and generate the standard color comparison table according to the correspondence table.

According to one aspect of the present disclosure, the coordinate point mapping module includes:

grouping the second hues of the coordinate points in the second converted color gamut according to an equivalence increasing order, recombining the second chroma and the second luminance in the same group into a group;

finding out, according to the first hue of each coordinate point in the first converted color gamut, a group corresponding to the coordinate point in the second converted color gamut; and finding out the second chroma and the second luminance in the corresponding group which are respectively closest to the first chroma and the first luminance corresponding to the first hue, and generating coordinate point in the second converted gamut corresponding to the coordinate point in the first converted gamut.

According to one aspect of the present disclosure, the coordinate point matching unit includes a coordinate point comparator, the coordinate point comparator is configured to compare values of the first chroma and the first luminance of the coordinate point in the first converted color gamut with all values of the second chroma and the second luminance in the corresponding group in the second converted color gamut, to find out the closest second chroma and second luminance.

According to one aspect of the present disclosure, the system further includes:

an input information acquiring module, configured to acquire coordinates of all pixel points of an input image in the first color gamut;

an input information converting module, configured to acquire the coordinate corresponding to each coordinate in the second color gamut according to the standard color comparison table; and an information output module, configured to generate an output image in the second color gamut according to all corresponding coordinates in the second color gamut.

According to one aspect of the present disclosure, the first color gamut is an RGB color gamut of a source end, and the first converted color gamut is a LCH color gamut corresponding to the RGB color gamut of the source end; and the second color gamut is an RGB color gamut of a display end, and the second converted color gamut is a LCH color gamut corresponding to the RGB color gamut of the display end.

Accordingly, the present disclosure further provides a method for retaining color gamut, the color gamut of an image which is transmitted from a first color gamut to a second color gamut is retained by generating a standard color comparison table of image colors in the first color gamut and image colors in the second color gamut, generating the standard color comparison table includes:

converting a color system of the first color gamut into a first converted color gamut, a coordinate of the first converted color gamut includes a first chroma, a first luminance, and a first hue;

converting a color system of the second color gamut into a second converted color gamut, a coordinate of the second converted color gamut includes a second chroma, a second luminance, and a second hue;

calculating a coordinate point in the second converted color gamut corresponding to each coordinate point in the first converted color gamut according to a corresponding algorithm;

generating a correspondence table of the first converted color gamut and the second converted color gamut according to correspondence relationships between the coordinate point in the first converted color gamut and the coordinate point in the second converted color gamut; and converting the first converted color gamut in the correspondence table into the color system of the first color gamut, and converting the second converted color gamut in the correspondence table into the color system of the second color gamut, and generating a standard color comparison table according to the correspondence table.

According to one aspect of the present disclosure, the operation of calculating a coordinate point in the second converted color gamut corresponding to each coordinate point in the first converted color gamut according to a corresponding algorithm, includes:

grouping the second hues of the coordinate points in the second converted color gamut according to an equivalence increasing order, recombining the second chroma and the second luminance in the same group into a group;

finding out, according to the first hue of each coordinate point in the first converted color gamut, a group corresponding to the coordinate point in the second converted color gamut; and finding out the second chroma and the second luminance in the corresponding group which are respectively closest to the first chroma and the first luminance corresponding to the first hue, and generating coordinate point in the second converted gamut corresponding to the coordinate point in the first converted gamut.

According to one aspect of the present disclosure, the operation of finding out the second chroma and the second luminance in the corresponding group which are respectively closest to the first chroma and the first luminance corresponding to the first hue, includes:

comparing values of the first chroma and the first luminance of the coordinate point in the first converted color gamut with all values of the second chroma and the second luminance in the corresponding group in the second converted color gamut, to find out the closest second chroma and second luminance.

According to one aspect of the present disclosure, the operation of retaining the color gamut of the image which is transmitted from the first color gamut to the second color gamut by the standard color comparison table, includes:

acquiring coordinates of all pixel points of an input image in the first color gamut;

acquiring the coordinate corresponding to each coordinate in the second color gamut according to the standard color comparison table; and generating an output image in the second color gamut according to all corresponding coordinates in the second color gamut.

According to one aspect of the present disclosure, the first color gamut is an RGB color gamut of a source end, and the first converted color gamut is a LCH color gamut corresponding to the RGB color gamut of the source end; and the second color gamut is an RGB color gamut of a display end, and the second converted color gamut is a LCH color gamut corresponding to the RGB color gamut of the display end.

The present disclosure aims to retain the color gamut, first converting the RGB color gamuts of the source end and the display end to the LCH color gamuts in sequence by a method of the color gamut conversion, and dividing all the H of the display end into different groups according to the equivalence increasing order, and determining which L and C in the group of the display end corresponding to H of the source end, inquiring the corresponding sequence of L and C of the display end, and finding out the corresponding RGB value point according to the sequence to generate a lookup table. When inputting an image, inquiring the output RGB based on the RGB value points in the input image through the lookup table, and finally outputting the image. The present disclosure can retain the output results of the image on different displays, to retain the color gamut of the image, therefore, the image processing speed becomes faster to save time and reduce the consumption of CPU.

BRIEF DESCRIPTION OF THE DRAWINGS

FIG. 5 is a flow chart of an operation of outputting the image after retaining the color gamut of the input image of the present disclosure according to an exemplary embodiment;

FIG. 6 is a flow chart of an operation of generating a standard color comparison table of the present disclosure according to an exemplary embodiment;

Figure 1:
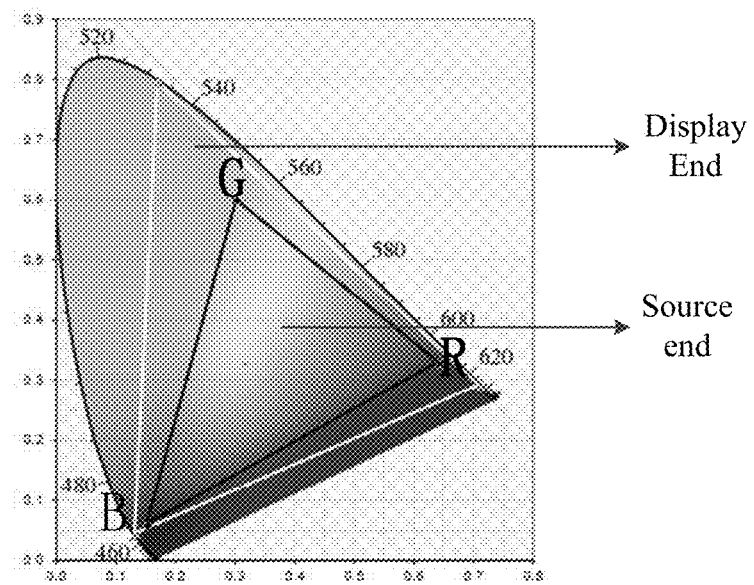
FIG. 1 is a CIE-xy chromaticity diagram for describing the color gamut developed by the International Lighting Association.
Figure 2:
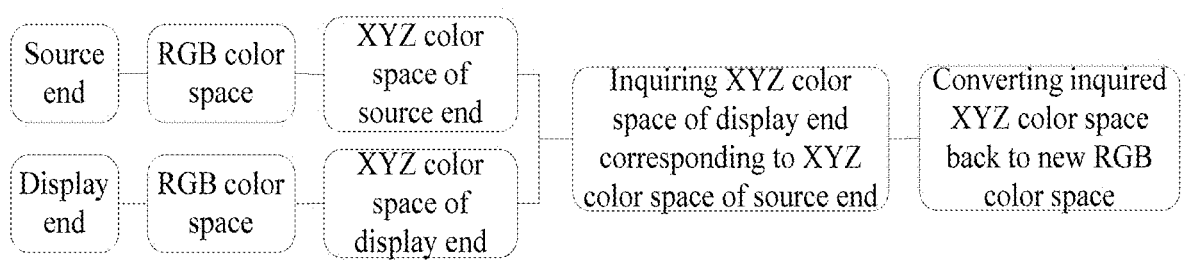
FIG. 2 is a flow chart of a current process for retaining color gamut of an image.

The realization of the aim, functional characteristics, advantages of the present disclosure are further described specifically with reference to the accompanying drawings and embodiments.

DETAILED DESCRIPTION

It should be understood that the specific embodiments described herein are merely illustrative of the present disclosure and are not intended to limit the present disclosure.

Prior to the detailed description of the embodiments of the present disclosure, it should be noted that some embodiments are described as processes or methods according to the flowcharts. Even though the flowcharts describe each of the steps or operations in an orderly sequence, many of the steps or operations can be executed in parallel, concurrently, or simultaneously. Moreover, the order of the steps or operations can be rearranged. Upon completion of the steps and operations, the execution can be terminated; however, there can also be additional steps or operations not included in the figures in applications. The execution can respond to methods, functions, procedures, subroutines and subprograms, and the like.

The specific structures and function details that are designed to describe the embodiments of the present disclosure are just exemplary. The present disclosure can be embodied in multiple ways, which are not designated to be limited to the embodiments described herein.

It should be understood that, although the terms "first," "second," and the like are probably used herein to describe units, these units should not be limited by these terms. The use of these terms only aims to distinguish one unit from another. For example, without departing from the scope of the exemplary embodiments, a "first unit" may be referred to as a "second unit," and similarly a "second unit" may be referred to as a "first unit". As used herein, the term "and/or" includes any and all combinations of one or more of the listed associated items.

The terminologies used herein are for the purpose of describing particular embodiments only and are not intended to limit the exemplary embodiments. Unless clearly specified otherwise in the context, the singular forms "a" and "an" used herein are also intended to include the plural forms. It should be further understood that, the terms "include" and/or "comprise" used herein specify the presence of the stated features, integers, steps, operations, units and/or components, but do not exclude the presence or addition of one or more other features, integers, steps, operations, units, components, and/or a combination thereof.

It should also be noted that, in certain embodiments, the functions/operations can be embodied in different orders from the ones described in the flowcharts. For example, two figures appearing in succession, based on the related functions/operations, can actually be embodied at substantially the same time or can be embodied in an opposite order to the one described in the figures.

The technical solution of the present disclosure can be further described in detail with reference to the drawings.

According to an exemplary embodiment of the present disclosure, a method for retaining color gamut is provided, the color gamut of an image which is transmitted from a first color gamut to a second color gamut is retained by generating a standard color comparison table of image colors in the first color gamut and image colors in the second color gamut. Specifically, the first color gamut refers to a color gamut of the source end, and the second color domain refers to a color gamut of the display end, and the first color gamut and the second color gamut are normally RGB color gamut, LCH color gamut, or other standard color gamut. In the exemplary embodiment, both the first color gamut and the second color gamut are RGB color gamut.

Figure 3A:
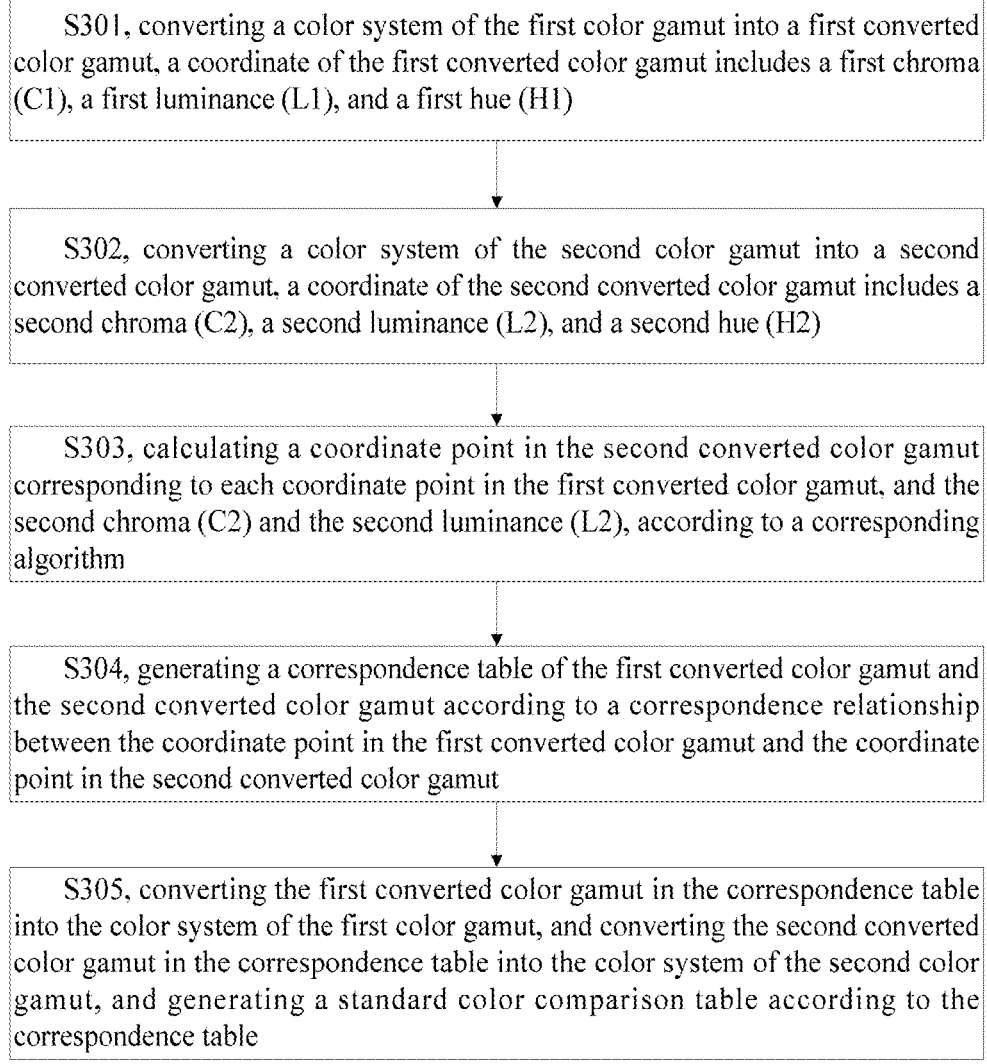
FIG. 3(a) is a flow chart of a method for retaining color gamut of the present disclosure according to an exemplary embodiment.

Referring to FIG. 3(a), in the present disclosure, the operation of generating the standard color comparison table includes:

S301, converting a color system of the first color gamut into a first converted color gamut, a coordinate of the first converted color gamut includes a first chroma C1, a first luminance L1, and a first hue H1;

S302, converting a color system of the second color gamut into a second converted color gamut, a coordinate of the second converted color gamut includes a second chroma (C2), a second luminance (L2), and a second hue (H2);

S303, calculating a second hue H2 in the second converted color gamut corresponding to the first hue H1 of each coordinate point in the first converted color gamut, and calculating the second chroma C2 and the second luminance L2, according to a corresponding algorithm;

S304, generating a correspondence table of the first converted color gamut and the second converted color gamut according to a correspondence relationship between the coordinate point in the first converted color gamut and the coordinate point in the second converted color gamut; and S305, converting the first converted color gamut in the correspondence table into the color system of the first color gamut, and converting the second converted color gamut in the correspondence table into the color system of the second color gamut, and generating a standard color comparison table according to the correspondence table.

The above steps can be described in detail in conjunction with the drawings.

First, in step S301, the color system of the first color gamut is the RGB color gamut of the source end, and the first converted color gamut is the LCH color gamut of the source end. The step S301 can convert the RGB color gamut system to the LCH color gamut, compared with the color display of the LCH color gamut, the color display of the RGB color gamut system is more sensitive to the display port, so as to match the color gamut of the display end conveniently. Similarly, in step S302, the color system of the second color gamut is the RGB color gamut of the display end, and the second converted color gamut is the LCH color gamut of the display end.

In the exemplary embodiment, the operation of converting the RGB color gamut to the LCH color gamut includes: converting a RGB color space to an XYZ color space which is a vector space including vectors from [0 0 0] to [255 255 255]. The order of [0 0 0] is 1, the order of [0 0 1] is 2, and so on. The vectors have orders from 1 to Ser. No. 16/777,216 (256*256*256). Next, calculating XYZ color matrixes of the source end and the display end by calculating the x and y coordinate points of the Red, Green, Blue, and White points of the tongue-shaped triangles of the source end and the display end, respectively. Finally, converting the XYZ color matrix to the LCH color gamut.

Converting the color systems of the different ports to one converted color gamut having the same standard through steps S301 and S302, to form one uniform color standard between the color system of the source end and that of the color system of the display end, the converted color gamut can be the LCH color gamut.

Figure 4A:
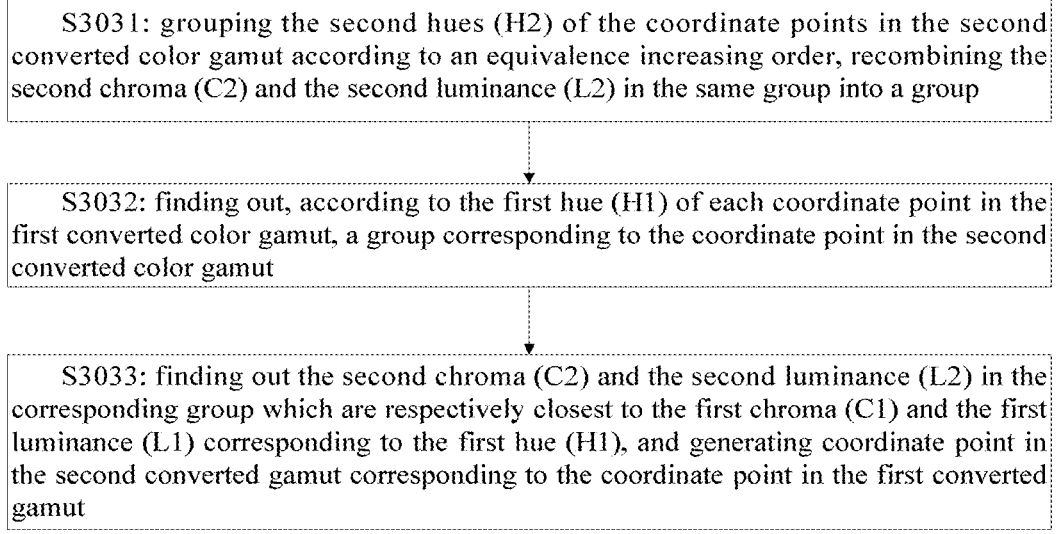
FIG. 4(a) is a flow chart of an operation of calculating a coordinate point in the second converted color gamut corresponding to each coordinate point in the first converted color gamut of the present disclosure according to an exemplary embodiment.
Figure 4B:
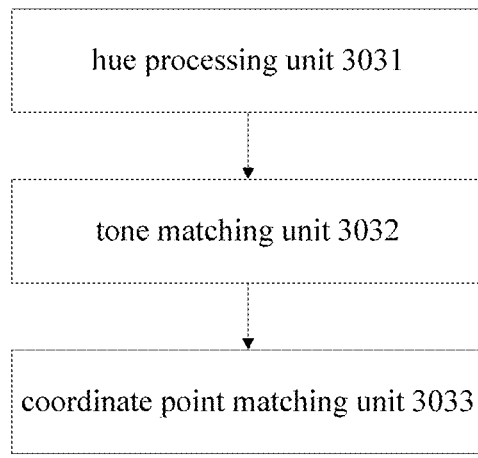
FIG. 4(b) is a structural diagram of a coordinate point matching unit of the present disclosure according to an exemplary embodiment.
Figure 7A:
FIG. 7 (a) is an original image of the present disclosure according to an exemplary embodiment.
FIG. 7(b) is the image shown in FIG. 7(a) processed by the method of the present disclosure.
Figure 7B:

Next, in step S303, calculating a coordinate point in the second converted color gamut corresponding to each coordinate point in the first converted color gamut according to a corresponding algorithm, that is, calculating a coordinate point in the LCH color gamut of the display end corresponding to each coordinate point in the LCH color gamut of the source end, and finding out correspondence relationship between two different color gamuts. Referring to FIG. 4(*a*), the step S303 includes:

S3031, grouping the second hues H2 of the coordinate points in the second converted color gamut according to an equivalence increasing order, recombine the second chroma C2 and the second luminance L2 in the same group into a group. For example, when H2=0~1, L2 and C2 corresponding to H2 in the LCH color gamut of the display end are divided into one group. When H2=1~2, L2 and C2 corresponding to H2 are divided into one group. Because H2 is in a range of 0 to 360, the LCH color gamut is divided into 360 groups according to the second hue H2 of the display end.

S3032, finding out, according to the first hue H1 of each coordinate point in the first converted color gamut, a group corresponding to the coordinate point in the second converted color gamut; that is, determining, according to the range of H1 of the coordinate point in the LCH color gamut of the source end, which group in the LCH color gamut of the display end corresponding to the coordinate point.

S3033, finding out the second chroma C2 and the second luminance L2 in the corresponding group which are respectively closest to the first chroma C1 and the first luminance L1 corresponding to the first hue H1, and generating coordinate point in the second converted gamut corresponding to the coordinate point in the first converted gamut. That is, comparing luminance L1 and chroma C1 of the coordinate point of the source end with the luminance L2 and chroma C2 in the group of the display end respectively, to find out which point having L2 and C2 closet to the L1 and C1, then determining the point to be the coordinate point corresponding to the coordinate point of the display end.

Each coordinate point of LCH color gamut of the source end can be correspond to one coordinate point of LCH color gamut of the display end through step S303. Then in step S304, the correspondence table of the first converted color gamut and the second converted color gamut is generated according to the correspondence relationship. Finally, in step S305, the standard color comparison table is generated according to the correspondence table. For a coordinate point [1 1 1] in the RGB color gamut of the source end, the first hue H1 corresponding to the coordinate point is 1.2 degrees, and it is determined that the coordinate point is belong to the second group in the LCH coordinates of the display end. Next, it is calculated which L2 and C2 in the second group are closest to L1 and C1 of the source end respectively, for example, it is determined that the closest order is 3, the coordinate point [0 0 2] of the display end corresponds to the coordinate point of the source end. The coordinate points of the source end are converted to the coordinate points of the display end in sequence, to generate the standard color comparison table of the color system of the source end and the color system of the display end.

According to the standard color comparison table, the method for retaining color gamut when the image is transmitted from the first color gamut (ie, the source end) to the second color gamut (display side) includes: acquiring coordinates of all the pixel points of the input image in the first color gamut; acquiring the coordinate in the second color gamut corresponding to each of the coordinates according to the standard color comparison table; generating the output image in the second color gamut according to all corresponding coordinates in the second color gamut.

The above method for retaining color gamut would be further described in detail in conjunction with the drawings. In the exemplary embodiment, the first color gamut is a RGB color gamut of a source end, and the first converted color gamut is a LCH color gamut corresponding to the RGB color gamut of the source end; and the second color gamut is an RGB color gamut of a display end, and the second converted color gamut is a LCH color gamut corresponding to the RGB color gamut of the display end.

Referring to FIG. 5, which shows an effective process of different displays output images with retained color gamut, the process includes two modules:

the first module, configured to calculate RGB value of the Display corresponding to RGB value of BT.709, and generate a lookup table. BT. 709 is defined as the source end, Display is defined as the display end (FIG. 6 shows the detail step).

the second module, configured to convert RGB color gamuts of BT. 709 and Display to LCH color gamuts.

Referring to FIG. 6, each operation of the first module is described in detail below.

Step 1, converting the RGB color gamut into an XYZ color gamut, specifically, Step 1 includes the following steps:

1.1. Arranging coordinate points of RGB in an order from [0 0 0] to [255 255 255], that is, [0 0 0] has the order of 1, and [0 0 1] has the order of 2, and so on. Therefore, the order ranges from 1 to Ser. No. 16/777,216 (256*256*256). The order in which BT.709 is stored is BT_index, and the order in which Display is stored is D_index. The color gamut conversion matrix of BT.709 is BT_A, and the color gamut conversion matrix of Display is D_A. Measuring the x and y coordinate points of the Red, Green, Blue, and White points of triangle in the tongue figure of BT.709 to calculate the BT_A. Similarly, Measuring the x and y coordinate points of the Red, Green, Blue, and White points of triangle in the tongue figure of Display to calculate the D_A. For example, the BT_A matrix is:

| 0.4124 | 0.3576 | 0.1805 |
| 0.2126 | 0.7152 | 0.0722 |
| 0.0193 | 0.1192 | 0.9505 |

The D_A matrix is:

| 0.5148 | 0.1936 | 0.2298 |
| 0.2343 | 0.6537 | 0.1120 |
| 0.0069 | 0.0921 | 1.2341 |

The converting process is that the numerical point of RGB is multiplied with the conversion matrix. After BT.709 is converted to XYZ color gamut, and the converted BT.709 is BT.709_XYZ. After Display is converted to XYZ color gamut, the converted Display is Display_XYZ.

1.2. Converting the XYZ color gamut to the Lab color gamut, where L is the luminance, a is the red-green axis, and b is the yellow-blue axis.

1.3. Converting Lab color gamut to LCH color gamut, and RGB of the converted BT.709 and Display correspond to 16777216 LCH values. Where L is luminance, C is chroma, H is hue, and H is in the range of 0 to 360. Defining the converted BT.709 and Display to be BT LCH color gamut and D_LCH color gamut. Similar to the order of step 1.1, the converted result is that the order of RGB of BT.709 from [0 0 0] to [255 255 255] corresponds to the L, C, H order of BT LCH, and the order of RGB of display end from [0 0 0] to [255 255 255] corresponds to the L, C, H order of D_LCH.

Step 2: for the D_LCH of the display end, recombining L and C in the same degree range into a group according to the order of H1 increasing by 1. That is, when H=0~1, L and C corresponding to H in the D_LCH color gamut are divided into one group. When H=1~2, L and C corresponding to H are divided into one group. Because H is in a range of 0 to 360, the D_LCH color gamut is divided into 360 groups.

Step 3: calculating B_LCH according to the RGB of inputted BT.709 through step 1, determining which group H belongs to according to the range of H of B_LCH, comparing L and C of B_LCH with L and C in the group of the display end where H is belonged to, to find out the L and C in the group which are closest to L and C of B_LCH, and determining RGB corresponding to the order of the closest LC of the display end as RGB corresponding to the inputted BT.709. The calculating formula is:

$$a(i)=\sqrt{(L-L_i)^2+(C-C_i)^2}$$

L and C are the first luminance value and the first chroma value of coordinate point in the first converted color gamut, and Li and Ci are the second luminance value and the second chroma value of any coordinate point in corresponding group in the second converted color gamut, a(i) is defined as the distance between the coordinate point in the first converted color gamut and the coordinate point in the second converted color gamut. It is determined that which value is closest to a(i), to find out the point having LC corresponding to i. Depending on the number of LC in D_LCH in step 1, the order of LC in D_LCH is found. In above formula, a (i) is the calculated result value, i is the number of H in this set of data, L and C are the LC of the inputted BT.709. For example, when the RGB of BT.709 is [1 1 1], the corresponding H is 1.2 degrees, then it is judged that L and C corresponding to H of D_LCH are belong to the second group through step 2, it is calculated that which LC in the second group are closest to LC of BT.709. If the closest order is 3, RGB[1 1 1] of BT.709 corresponds to RGB[0 0 2] of the Display.

Step 4: inquiring the RGB value of the display end corresponding to the order, according to the order of the closest point in step 3. Then corresponding 256*256*256 points of inputted BT.709 to 256*256*256 points of display end respectively.

Next, as shown in the second module, inputting an image, reading the RGB value of each pixel point of the image by row and column, and finding out the RGB value of the pixel point of the display end corresponding to each pixel point of the image according to the standard color comparison table generated in the first module. The processing result is shown in FIG. 6. FIG. 6(a) is the original image, and FIG. 6(b) is the processed image. In this way, different images inputted from the source end can be effectively processed to obtained RGB values of the display end, and the color gamut of the display end is extended, images are outputted according to the RGB values. It is more conducive to the color gamut extension of the image, and the gamut range of the source end can be extended to the gamut ranges of different display ends.

Figure 3B:
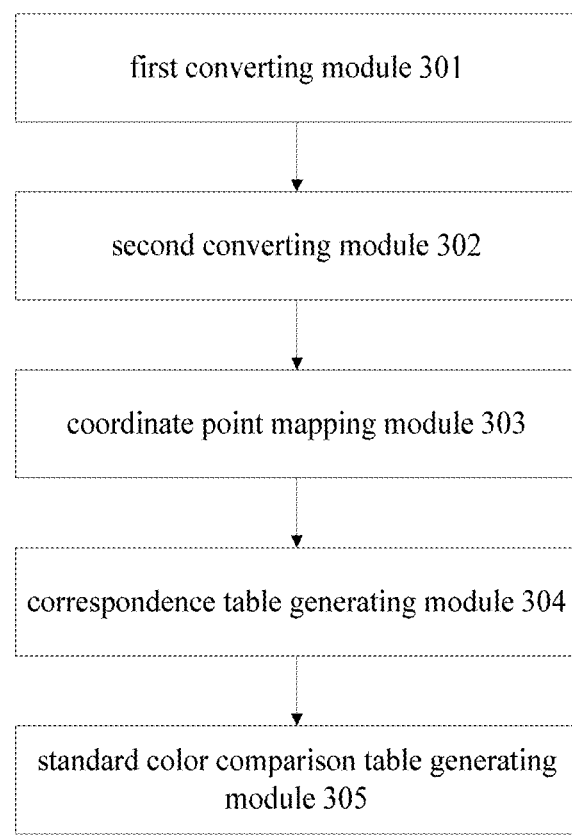
FIG. 3(b) is a schematic diagram of a system for retaining color gamut of the present disclosure according to an exemplary embodiment.

Accordingly, the present disclosure provides a system for retaining color gamut, the color gamut of an image which is transmitted from a first color gamut to a second color gamut is retained by generating a standard color comparison table of image colors in the first color gamut and image colors in the second color gamut, referring to FIG. 3(b), the system includes:

a first converting module 301, configured to convert a color system of the first color gamut into a first converted color gamut, a coordinate of the first converted color gamut includes a first chroma C1, a first luminance L1, and a first hue H1;

a second converting module 302, configured to convert a color system of the second color gamut into a second converted color gamut, a coordinate of the second converted color gamut includes a second chroma C2, a second luminance L2, and a second hue H2;

a coordinate point mapping module 303, configured to calculate a coordinate point in the second converted color gamut corresponding to each coordinate point in the first converted color gamut according to a corresponding algorithm;

a correspondence table generating module 304, configured to generate a correspondence table of the first converted color gamut and the second converted color gamut according to a correspondence relationship between the coordinate point in the first converted color gamut and the coordinate point in the second converted color gamut; and a standard color comparison table generating module 305, configured to convert the first converted color gamut in the correspondence table into the color system of the first color gamut, and convert the second converted color gamut in the correspondence table into the color system of the second color gamut, and generate the standard color comparison table according to the correspondence table.

The color system of the first color gamut is the RGB color gamut of the source end, the first converted color gamut is the LCH color gamut. The second converting module 302 converts the RGB color gamut system to the LCH color gamut, compared with the color display of the LCH color gamut, the color display of the RGB color gamut system is more sensitive to the display port, so as to match the color gamut of the display end conveniently. Similarly, in the coordinate point corresponding to module 303, the color system of the second color gamut is the RGB color gamut of the display end, and the second converted color gamut is the LCH gamut of the display end. The color systems of different ports are transformed into one converted color gamut having the same standard through the first and second converting modules, to form one uniform color standard between the color system of the source end and that of the color system of the display end, the converted color gamut can be the LCH color gamut, Referring to FIG. 4(b), the coordinate point mapping module 303 includes:

a hue processing unit 3031, configured to group the second hues H2 of the coordinate points in the second converted color gamut according to an equivalence increasing order, recombine the second chroma C2 and the second luminance L2 in the same group into a group. For example, when H2=0~1, L2 and C2 corresponding to H2 in the LCH color gamut of the display end are divided into one group. When H2=1~2, L2 and C2 corresponding to H2 are divided into one group. Because H2 is in a range of 0 to 360, the LCH color gamut is divided into 360 groups according to the second hue H2 of the display end;

a tone matching unit 3032, configured to find out, according to the first hue H1 of each coordinate point in the first converted color gamut, a group corresponding to the coordinate point in the second converted color gamut. That is, according to the range of H1 of the coordinate point in the LCH color gamut of the source end, it is determined that which group, in the LCH color gamut of the display end, the coordinate point belongs to. A coordinate point matching unit 3033, configured to find out the second chroma C2 and the second luminance L2 in the corresponding group which are respectively closest to the first chroma C1 and the first luminance L1 corresponding to the first hue H1, and generate a coordinate point in the second converted gamut corresponding to the coordinate point in the first converted gamut. That is, the coordinate point matching unit 3033 is configured to compare L1 and C1 of the coordinate point of the source end with L2 and C2 in the group of the display end, to find out L2 and C2 which are closest to L1 and C1, then the coordinate point of L2 and C2 is configured to correspond to the coordinate point of the display end.

Each coordinate point of LCH color gamut of the source end can be correspond to one coordinate point of LCH color gamut of the display end through the coordinate point matching unit 3033. Then the correspondence table of the first converted color gamut and the second converted color gamut is generated according to the correspondence relationship through the correspondence table generating module 304. Finally, the standard color comparison table is generated according to the correspondence table through the standard color comparison table generating module 305. For a coordinate point [1 1 1] in the RGB color gamut of the source end, the first hue H1 corresponding to the coordinate point is 1.2 degrees, and it is determined that the coordinate point is belong to the second group in the LCH coordinates of the display end. Next, it is calculated which L and C in the second group are closest to L1 and C1 of the source end respectively, for example, it is determined that the closest order is 3, the coordinate point [0 0 2] of the display end corresponds to the coordinate point of the source end. The coordinate points of the source end are converted to the coordinate points of the display end in sequence, to generate the standard color comparison table of the color system of the source end and the color system of the display end.

According to the standard color comparison table, when the image is transmitted from the first color gamut (source end) to the second color gamut (display end), the system for retaining color gamut further includes:

an input information acquiring module, configured to acquire coordinates of all pixel points of an input image in the first color gamut; an input information converting module, configured to acquire the coordinate corresponding to each coordinate in the second color gamut according to the standard color comparison table; and an information output module, configured to generate an output image in the second color gamut according to all corresponding coordinates in the second color gamut.

The present disclosure aims to retain the color gamut, first converting the RGB color gamuts of the source end and the display end to the LCH color gamuts in sequence by a method of the color gamut conversion, and dividing all the H of the display end into different groups according to the equivalence increasing order, and determining which L and C in the group of the display end corresponding to H of the source end, inquiring the corresponding sequence of L and C of the display end, and finding out the corresponding RGB value point according to the sequence to generate a lookup table. When inputting an image, inquiring the output RGB based on the RGB value points in the input image through the lookup table, and finally outputting the image. The present disclosure can retain the output results of the image on different displays, to retain the color gamut of the image, the image processing speed becomes faster to save time and reduce the consumption of CPU.

As can be apparent to those skilled in the art, the invention will not be limited to the details of the foregoing illustrative embodiments and can be embodied in other specific forms without departing from the spirit or essence of the invention. Therefore the embodiments shall be construed in any respect as being illustrative but not limiting, and the scope of the invention shall be defined in the appended claims instead of the foregoing description, so the invention is intended to encompass all the variations coming into the scope of the claims and their equivalents. Any reference numerals in the claims shall not be construed as limiting the claims where they appear. Furthermore apparently the term "comprising" will not preclude another element or step and a singular form will not preclude a plural form. A plurality of units or means recited in a system claim can alternatively be implemented as a single unit or means in software or hardware. The words "first", "second", etc., are intended to represent a name without suggesting any specific order.

What is claimed is:

1. A system for retaining color gamut, retaining the color gamut of an image which is transmitted from a first color gamut to a second color gamut by generating a standard color comparison table of image colors in the first color gamut and image colors in the second color gamut, wherein the system comprises:
    a first converting module, configured to convert a color system of the first color gamut into a first converted color gamut, a coordinate of the first converted color gamut comprises a first chroma (C1), a first luminance (L1), and a first hue (H1);
    a second converting module, configured to convert a color system of the second color gamut into a second converted color gamut, a coordinate of the second converted color gamut comprises a second chroma (C2), a second luminance (L2), and a second hue (H2);
    a coordinate point mapping module, configured to calculate a coordinate point in the second converted color gamut corresponding to each coordinate point in the first converted color gamut according to a corresponding algorithm;
    a correspondence table generating module, configured to generate a correspondence table of the first converted color gamut and the second converted color gamut according to a correspondence relationship between the coordinate point in the first converted color gamut and the coordinate point in the second converted color gamut; and
    a standard color comparison table generating module, configured to convert the first converted color gamut in the correspondence table into the color system of the first color gamut, convert the second converted color gamut in the correspondence table into the color system of the second color gamut, and generate the standard color comparison table according to the correspondence table.

2. The system for retaining color gamut according to claim 1, wherein the coordinate point mapping module comprises:
    a hue processing unit, configured to group the second hues (H2) of the coordinate points in the second converted color gamut according to an equivalence increasing order, recombine the second chroma (C2) and the second luminance (L2) in the same group into a group;

a tone matching unit, configured to find out, according to the first hue (H1) of each coordinate point in the first converted color gamut, a group corresponding to the coordinate point in the second converted color gamut; and a coordinate point matching unit, configured to find out the second chroma (C2) and the second luminance (L2) in the corresponding group which are respectively closest to the first chroma (C1) and the first luminance (L1) corresponding to the first hue (H1), and generate a coordinate point in the second converted gamut corresponding to the coordinate point in the first converted gamut.

3. The system for retaining color gamut according to claim 2, wherein the coordinate point matching unit comprises a coordinate point comparator, the coordinate point comparator is configured to compare values of the first chroma (C1) and the first luminance (L1) of the coordinate point in the first converted color gamut with all values of the second chroma (C2) and the second luminance (L2) in the corresponding group in the second converted color gamut, to find out the closest second chroma (C2) and second luminance (L2).

4. The system for retaining color gamut according to claim 1, further comprising:
- an input information acquiring module, configured to acquire coordinates of all pixel points of an input image in the first color gamut;
- an input information converting module, configured to acquire the coordinate corresponding to each coordinate in the second color gamut according to the standard color comparison table; and
- an information output module, configured to generate an output image in the second color gamut according to all corresponding coordinates in the second color gamut.

5. The system for retaining color gamut according to claim 1, wherein
the first color gamut is an RGB color gamut of a source end, and the first converted color gamut is a LCH color gamut corresponding to the RGB color gamut of the source end; and
the second color gamut is an RGB color gamut of a display end, and the second converted color gamut is a LCH color gamut corresponding to the RGB color gamut of the display end.

6. The system for retaining color gamut according to claim 2, wherein
the first color gamut is an RGB color gamut of a source end, and the first converted color gamut is a LCH color gamut corresponding to the RGB color gamut of the source end; and
the second color gamut is an RGB color gamut of a display end, and the second converted color gamut is a LCH color gamut corresponding to the RGB color gamut of the display end.

7. The system for retaining color gamut according to claim 3, wherein
the first color gamut is an RGB color gamut of a source end, and the first converted color gamut is a LCH color gamut corresponding to the RGB color gamut of the source end; and
the second color gamut is an RGB color gamut of a display end, and the second converted color gamut is a LCH color gamut corresponding to the RGB color gamut of the display end.

8. The system for retaining color gamut according to claim 4, wherein the first color gamut is an RGB color gamut of a source end, and the first converted color gamut is a LCH color gamut corresponding to the RGB color gamut of the source end; and
the second color gamut is an RGB color gamut of a display end, and the second converted color gamut is a LCH color gamut corresponding to the RGB color gamut of the display end.

9. A method for retaining color gamut, retaining the color gamut of an image which is transmitted from a first color gamut to a second color gamut by generating a standard color comparison table of image colors in the first color gamut and image colors in the second color gamut, wherein generating the standard color comparison table comprises:
converting a color system of the first color gamut into a first converted color gamut, a coordinate of the first converted color gamut comprises a first chroma (C1), a first luminance (L1), and a first hue (H1);
converting a color system of the second color gamut into a second converted color gamut, a coordinate of the second converted color gamut comprises a second chroma (C2), a second luminance (L2), and a second hue (H2);
calculating a coordinate point in the second converted color gamut corresponding to each coordinate point in the first converted color gamut according to a corresponding algorithm;
generating a correspondence table of the first converted color gamut and the second converted color gamut according to a correspondence relationship between the coordinate point in the first converted color gamut and the coordinate point in the second converted color gamut; and
converting the first converted color gamut in the correspondence table into the color system of the first color gamut, and converting the second converted color gamut in the correspondence table into the color system of the second color gamut, and generating a standard color comparison table according to the correspondence table.

10. The method for retaining color gamut according to claim 9, wherein the operation of calculating a coordinate point in the second converted color gamut corresponding to each coordinate point in the first converted color gamut according to a corresponding algorithm, comprises:
grouping the second hues (H2) of the coordinate points in the second converted color gamut according to an equivalence increasing order, recombining the second chroma (C2) and the second luminance (L2) in the same group into a group;
finding out, according to the first hue (H1) of each coordinate point in the first converted color gamut, a group corresponding to the coordinate point in the second converted color gamut; and
finding out the second chroma (C2) and the second luminance (L2) in the corresponding group which are respectively closest to the first chroma (C1) and the first luminance (L1) corresponding to the first hue (H1), and generating coordinate point in the second converted gamut corresponding to the coordinate point in the first converted gamut.

11. The method for retaining color gamut according to claim 10, wherein the operation of finding out the second chroma (C2) and the second luminance (L2) in the corresponding group which are respectively closest to the first chroma (C1) and the first luminance (L1) corresponding to the first hue (H1), comprises:

comparing values of the first chroma (C1) and the first luminance (L1) of the coordinate point in the first converted color gamut with all values of the second chroma (C2) and the second luminance (L2) in the corresponding group in the second converted color gamut, to find out the closest second chroma (C2) and second luminance (L2).

12. The method for retaining color gamut according to claim 9, wherein the operation of retaining the color gamut of the image which is transmitted from the first color gamut to the second color gamut by the standard color comparison table, comprises:

acquiring coordinates of all pixel points of an input image in the first color gamut;

acquiring the coordinate corresponding to each coordinate in the second color gamut according to the standard color comparison table; and generating an output image in the second color gamut according to all corresponding coordinates in the second color gamut.

13. The method for retaining color gamut according to claim 9, wherein the first color gamut is an RGB color gamut of a source end, and the first converted color gamut is a LCH color gamut corresponding to the RGB color gamut of the source end; and the second color gamut is an RGB color gamut of a display end, and the second converted color gamut is a LCH color gamut corresponding to the RGB color gamut of the display end.

14. The method for retaining color gamut according to claim 10, wherein the first color gamut is an RGB color gamut of a source end, and the first converted color gamut is a LCH color gamut corresponding to the RGB color gamut of the source end; and the second color gamut is an RGB color gamut of a display end, and the second converted color gamut is a LCH color gamut corresponding to the RGB color gamut of the display end.

15. The method for retaining color gamut according to claim 11, wherein the first color gamut is an RGB color gamut of a source end, and the first converted color gamut is a LCH color gamut corresponding to the RGB color gamut of the source end; and the second color gamut is an RGB color gamut of a display end, and the second converted color gamut is a LCH color gamut corresponding to the RGB color gamut of the display end.

16. The method for retaining color gamut according to claim 12, wherein the first color gamut is an RGB color gamut of a source end, and the first converted color gamut is a LCH color gamut corresponding to the RGB color gamut of the source end; and the second color gamut is an RGB color gamut of a display end, and the second converted color gamut is a LCH color gamut corresponding to the RGB color gamut of the display end.

* * * * *